(12) United States Patent
Sankar

(10) Patent No.: US 10,122,220 B2
(45) Date of Patent: Nov. 6, 2018

(54) WIRELESS POWER SYSTEM FOR PORTABLE DEVICES UNDER ROTATIONAL MISALIGNMENT

(71) Applicant: WiPQTUS INC., Cupertino, CA (US)

(72) Inventor: Ganapathy Sankar, Cupertino, CA (US)

(73) Assignee: WIPQTUS INC., Cupertino, CA (US)

( * ) Notice: Subject to any disclaimer, the term of this patent is extended or adjusted under 35 U.S.C. 154(b) by 558 days.

(21) Appl. No.: 14/740,260

(22) Filed: Jun. 16, 2015

(65) Prior Publication Data

US 2015/0372493 A1    Dec. 24, 2015

Related U.S. Application Data

(60) Provisional application No. 62/013,705, filed on Jun. 18, 2014.

(51) Int. Cl.
| H02J 50/10 | (2016.01) |
| H02J 50/60 | (2016.01) |
| H02J 7/02 | (2016.01) |
| H02J 50/90 | (2016.01) |
| H02J 5/00 | (2016.01) |

(52) U.S. Cl.
CPC .............. *H02J 50/60* (2016.02); *H02J 5/005* (2013.01); *H02J 7/025* (2013.01); *H02J 50/10* (2016.02); *H02J 50/90* (2016.02)

(58) Field of Classification Search
None
See application file for complete search history.

(56) References Cited

U.S. PATENT DOCUMENTS

| 2012/0175967 A1* | 7/2012 | Dibben | H02J 5/005 307/104 |
| 2014/0152117 A1* | 6/2014 | Sankar | H03H 7/40 307/104 |
| 2014/0191568 A1* | 7/2014 | Partovi | H02J 7/025 307/9.1 |
| 2016/0218520 A1* | 7/2016 | Mehas | H02J 50/12 |
| 2017/0331334 A1* | 11/2017 | Park | H02J 50/60 |

* cited by examiner

*Primary Examiner* — Jared Fureman
*Assistant Examiner* — Joel Barnett

(57) ABSTRACT

A wireless power transmitter (WPT) including a first, second, third circuit and a transmit coil for wirelessly delivering power to a wireless power receiver (WPR) including a receiver coil, rectifier, impedance network, protection circuitry, control logic, modulator/demodulator and ADC is provided. A method that enables WPT and WPR to deliver the required power to the WPR's downstream load in planar, orthogonal and intermediate modes of WPR placement on WPT is provided. The WPR is integrated into the strap/frame or in the vital area of the device. To avoid a heated metal object safety issue, the WPT implements a metal object detect algorithm to detect metal objects and terminate transmission of power. To protect their circuitry from induced voltage spikes in excess of acceptable levels, the WPR includes a simple protection circuitry that naturally turns on and siphons out the excess power when the acceptable threshold levels are exceeded.

18 Claims, 10 Drawing Sheets

WIRELESS POWER SYSTEM FOR PORTABLE DEVICES UNDER ROTATIONAL MISALIGNMENT

BACKGROUND

Wearable devices such as smart watches, fitness trackers, smart glass etc., are gaining in popularity in the marketplace today. Consumers who want to lose weight and/or improve their health can benefit from these wearable devices by being aware of the level of their physical activity on a day-by-day, week-by week basis, etc. Such awareness helps motivate the customer to use the stairs or walk the dog an extra lap around the block. These Wearable devices are smart and accurate. Besides measuring how much one walks, they provide good insight into lifestyle habits such as sleep, calorie consumption, heart rate, blood pressure, skin temperature, perspiration, etc.

Wearable devices operate of a rechargeable battery. These batteries are typically recharged via a Universal Serial Bus (USB) Interface connectors or via wireless power. Wireless power enables a slimmer construction and waterproof capability for the Wearable device besides being a more convenient means for recharging for the consumer. However, the wireless power receiver circuitry is typically included in the back of the watch or that portion of the fitness tracker which makes contact with the skin. This back part of the Wearable device is prime real estate as this is where the sensors to measure heart rate, skin temperature, etc., are included. When included in this valuable space, the wireless power circuitry reduces the space that is available for the sensors. Their proximity may trigger incorrect operation and false alarms in the sensors and/or in the operation of the wireless power circuitry.

Wearables are built in different shapes and sizes. Some Wearables such as the smart watches have a flat surface area such as in the back of the watch while other Wearables such as the fitness trackers, hearing-aids, smart glasses, etc., have very little flat surface area. When the flat surface area is limited, the wireless power transmit circuitry in the charger and the wireless power receiver circuitry in the portable device are usually rotationally misaligned when the portable device is placed on the charger. Even when there is sufficient flat surface area, the device may be placed on the charger in a fashion wherein there is significant rotational misalignment between the wireless power circuitries in the portable device and the charger. For example, instead of being placed flat on its back, a smartwatch may be placed vertically on its straps on the charger. Existing wireless charging technologies and solutions can wirelessly charge the device when the level of rotational misalignment is typically less than 30 degrees. When the level of rotational misalignment exceeds this level, the charger is unable to wirelessly charge the portable device.

Therefore, there is an unmet need for a wireless power system that may occupy very little to no space in this vital sensor area of the device, which by design can be physically apart and hence have little interaction with the sensors and other critical circuitry in the device and which can wirelessly charge the portable device when the device is placed on the charger irrespective of the level of rotational misalignment between the wireless charging circuitry in the device and charger.

SUMMARY OF THE INVENTION

The wireless power system comprises of the wireless power transmitter and the wireless power receiver. The wireless power receiver is integrated into a portable device. The wireless power transmitter, also referred herein as the charger, is typically contained in a wireless charging pad. Alternately, it may be integrated into furniture such as in a table-top, couch (in the armrest), etc.; it may be integrated into the console bin of an automobile to enable wireless charging while driving. The wireless power system and method disclosed herein enables the delivery of the required amount of power from the wireless power transmitter to the wireless power receiver even when the respective inductively coupled coil circuitries are rotationally misaligned.

A wireless power transmitter for sufficiently wirelessly powering a rotationally misaligned and hence non-ideally located wireless power receiver is provided. The wireless power transmitter comprises a first circuit, a second circuit, and a third circuit. The first circuit receives an input voltage from an external power source. The first circuit includes a switch network which is configured as an inverter in one of multiple inverter topologies, for example, a half bridge inverter topology, a full bridge inverter topology, a class D inverter topology, a class E inverter topology, etc. In an embodiment, the first circuit also includes a power conversion block that is connected between the external power source and the switch network. The power conversion block is configured in one of multiple DC-DC topologies such as buck, boost, buck-boost, etc wherein the power conversion block modifies the input voltage Vin to higher value (step-up) or lower value (step-down) or leaves it unchanged (pass-through). In an embodiment, the power conversion block may be configured as an AC-DC power supply wherein the power conversion block transforms the AC mains power to a regulated DC voltage for the switch network's use. In another embodiment, the switch network is configured as a direct AC-AC converter where the switch network is directly fed with the AC mains power or with AC mains power post-rectification but with significant DC bus voltage ripple. Based on signals from the third circuit, the transistors in the switch network are activated in synch with the voltage direction of the AC mains power, effectively injecting AC mains power into the tank circuitry that is downstream of the switch network.

The second circuit is a variable matching circuit. The second circuit can be used with any first circuit to appropriately bias and allow the system to regulate the transmitted power. The second circuit is connected between the first circuit and a transmitter coil. In an embodiment, the second circuit includes a variable tuning circuit which adjusts its circuitry to enable higher efficiency at the wireless power transmitter's operating frequency. The tuning circuit is connected between the variable matching circuit and the transmitter coil. The transmitter coil is configured to wirelessly transmit power to the wireless power receiver. In an embodiment, the wireless power transmitter contains a plurality of coils and switches where one or more transmitter coils may be activated via the associated switch to wirelessly transmit power to the wireless power receiver.

The third circuit includes a control logic circuit that is configured to provide a pulse width modulated (PWM) signal to the first circuit. The third circuit is aware of important dynamic circuit characteristics of the wireless power transmitter via the ADC block and other specialized logic in the control logic circuit. The third circuit is aware of important dynamic power characteristics of the wireless power receiver via communicated messages from the wireless power receiver that are processed and deciphered in the modulator/demodulator block. The messages from the wireless power receiver may be received in-band or out-of-band with respect to the wireless power transfer. The third circuit is configured to change the input voltage of the switch network, to drive the first circuit to change a topology of the first circuit, to drive the second circuit to change impedance offered by the second circuit, to drive the second circuit to change its tuning characteristics, to select the transmit coil(s), to constrain the frequency range of the PWM signal, to constrain the duty cycle range of the PWM signal or any combination thereof. The change in the input voltage of the switch network or change in topology of the first circuit or change in impedance offered of the second circuit or change in tuning characteristics of the second circuit or change in the transmit coil used or the applied constraints on the frequency and duty cycle of the PWM signal or combination thereof help ensure sufficient delivery of wireless power from the wireless power transmitter to the wireless power receiver effectively compensating for the rotational misalignment that may exist between the coils of the wireless power transmitter and wireless power receiver.

A wireless power receiver circuitry for reliably receiving and conditioning the wireless power from the wireless power transmitter is provided. The wireless power receiver includes the receiver coil, impedance network, rectifier, protection circuitry, control logic, modulator/demodulator block and ADC block. The wireless power receiver receives wireless power from the wireless power transmitter via the receiver coil. The amount of wireless power received is controlled via the impedance network. The rectifier conditions the alternating current (AC) power into direct current (DC) power. By enabling/disabling appropriate switches, the topology of the rectifier can be selected from one of asynchronous, half-synchronous, fully synchronous and voltage multiplier. In an embodiment, the rectifier may further include one of a switched-capacitor/charge-pump circuit and a boost circuit to further increase the DC voltage, post initial AC-DC rectification. The protection circuitry monitors critical dynamic current and voltage characteristics in the internal circuitry of the wireless power receiver and takes rapid evasive action if the circuit characteristics are not within acceptable bounds. Analog input signals are converted to digital signals by an analog to digital converter ADC block, operably coupled to the control logic circuit of the wireless power receiver. The ADC block measures important dynamic circuit characteristics in the internal circuitry of the wireless power receiver. The control logic monitors the internal dynamic circuit characteristics of the wireless power receiver. The control logic is aware of the power drawn by the downstream load (RL) via the ADC block. The downstream load performs functions such as charging the battery, delivering power to operate the device, etc. Based on the power drawn by the downstream load (RL), the control logic communicates messages via the modulator/demodulator block to the wireless power transmitter to increase, decrease, maintain or stop the power transmitted. These messages help the wireless power system robustly regulate the power delivery to match the needs of the downstream load in the wireless power receiver. The modulator/demodulator block may send these messages in-band or out-of-band with respect to the wireless power transfer.

The control logic also communicates additional messages via the modulator/demodulator block to the wireless power transmitter regarding the dynamic total power absorbed into the wireless power receiver. This information helps the wireless power system detect the presence of extraneous foreign metal objects in the magnetic flux coupling zone of the wireless power transmitter. When an extraneous foreign metal object is detected, the wireless power system asserts an alarm and/or aborts the power transfer. Thus, in addition to effective power delivery, these messages from the wireless power receiver's control logic to the wireless power transmitter help ensure the safety of the power transfer.

In a first embodiment of the wireless power receiver, the control logic combines the information received from the ADC block with dynamic operational characteristics such as the frequency and duty cycle of wireless power that it measures via its specialized logic to sense the level of magnetic flux coupling between the coils of the wireless power transmitter and wireless power receiver. Based on the level of magnetic flux coupling and the power drawn by the downstream load (RL), the control logic communicates messages via the modulator/demodulator block to the wireless power transmitter to stop, maintain, increase or decrease the amount of wireless power transmitted. The control logic circuit may additionally update the impedance of the impedance network, the topology of the rectifier and the inclusion and configuration of the switched-capacitor/charge-pump/boost circuit of the rectifier to further compensate for the level of magnetic flux coupling between the coils of the wireless power transmitter and wireless power receiver.

In a second embodiment of the wireless power receiver, the control logic dynamically adjusts the impedance networks and rectifier to regulate their received power to match the power drawn by the downstream load. The control logic is not aware of the level of magnetic flux coupling and makes these adjustments dynamically as power is being drawn by the downstream load. If the received power is still not sufficient or if it is in excess, the wireless power receiver sends messages to the wireless power transmitter to increase or decrease the transmitted power appropriately.

In an embodiment of the wireless power system and method disclosed herein, the entire or a significant portion of the wireless power receiver circuitry is integrated into a non-critical area of the portable device. This non-critical area of the portable device is a different location on the portable device away from the vital area of the portable device where critical circuitry such as the camera module, display module, heart rate sensor, skin temperature sensor and other sensors are contained in the portable device. As a result, by construction, the wireless power receiver circuitry is configured to not eat into the critical space that is better used for sensitive sensors and modules. By virtue of physical separation, the wireless charging system would have little or reduced impact on the performance of those sensors and modules; and vice versa, the sensors and modules will also not impact or will have reduced impact on the performance of the wireless charging system.

In another embodiment of the wireless power system disclosed herein, the wireless power receiver's receiver coil alone is integrated into the strap or frame of the smart watch, fitness tracker, smart glass, smart clothing or other smart wearable device. The remaining wireless power receiver circuitry is located in a different part of the Wearable device and may be in close proximity to the sensors and modules.

The wireless power receiver's receiver coil is usually made of fine wire gauge multi-turn copper or other suitable metal. In an embodiment, the receiver coil is fabricated via a process such as etching, printing, lithography, etc., directly into the portable device. The coil may be formulated on a hard substrate or a flexible substrate. The receiver coil is fabricated into a component of the portable devices such as the body, the strap, the frame, etc. These components are manufactured and procured with the receiver coil integrated natively.

The strap or frame of the portable device containing the receiver coil may be placed flat on top of the wireless power transmitter coil such that the receiver coil and transmitter coil are parallel to each other. In such a placement of the device on the charger, there is no rotational misalignment between the wireless power receiver's receiver coil and the wireless power transmitter's transmitter coil. Such an alignment between the transmitter and receiver coils is referred herein as the planar mode. Alternately, the strap or frame of the portable device may be placed perpendicular on the wireless power transmitter coil such that the receiver coil and transmitter coil are perpendicular to each other. In such a placement of the device on the charger, there is a 90 degrees rotational misalignment between the wireless power receiver's receiver coil and the wireless power transmitter's transmitter coil. Such an alignment between the transmitter and receiver coils is referred herein as the orthogonal mode. The device may also be placed on the charger in such a fashion that the rotational misalignment between the wireless power receiver's receiver coil and the wireless power transmitter's transmitter coil is between 0 degrees (planar) and 90 degrees (orthogonal). Such an alignment between the transmitter and receiver coils is referred herein as the intermediate mode.

The wireless power transmitter generates an electromagnetic field in a coupling region for providing energy transfer to the wireless power receiver. When the wireless power receiver is placed on the wireless power transmitter, a portion of the magnetic flux emanating from the transmitter coil travels through the receiver coil. Based on the separation and rotational misalignment between the receiver coil and transmitter coil, the amount of magnetic flux intersecting or coupling into the receiver coil varies. When the device is placed on the charger, the rotational misalignment between the coils may be in planar mode or in orthogonal mode or in an intermediate mode. The magnetic flux coupling characteristics in the wireless power receiver are different for each of these modes. In addition, in each of these modes, based on the separation in the X-plane, Y-plane and Z-plane between the transmitter coil and receiver coil, the magnetic flux coupling characteristics in the wireless power receiver further varies. The wireless power system and method disclosed herein senses, communicates and recognizes the level of magnetic flux coupling at the wireless power receiver under the different scenarios. The wireless power system dynamically reconfigures one or more of the elements in the first circuit, second circuit and third circuit of the wireless power transmitter and/or one or more of the elements in the impedance network and rectifier of the wireless power receiver to deliver stable wireless power as drawn by the circuitry that is downstream of the wireless power receiver in the device.

Disclosed herein are also methods for establishing a sufficient and safe wireless power transfer from wireless power transmitter to wireless power receiver when wireless power receiver contained in a portable device is placed on wireless power transmitter in one of planar, orthogonal and intermediate modes. The wireless power transmitter starts operating on receiving power and probes its surface periodically for presence of wireless power receiver. When a portable device containing wireless power receiver is placed on surface of the wireless power transmitter, the wireless power transmitter provides power to start up the wireless power receiver. On powering up, the wireless power receiver sends messages to the wireless power transmitter communicating its type, capabilities and internal circuit characteristics such as initial voltage, etc. The wireless power transmitter combines this information from the wireless power receiver with operational and circuit characteristics in its internal circuitry such as current, voltage, frequency, phase difference, etc., to detect the level of magnetic flux coupling between the transmitter coil and the receiver coil. The wireless power transmitter configures its circuitry and operating limits based on information received from wireless power receiver as well as the detected level of magnetic flux coupling between transmitter coil and receiver coil. The wireless power transmitter continues to listen to messages from wireless power receiver and adjusts its operating point for appropriate power transfer to the wireless power receiver. When portable device containing wireless power receiver is removed from surface of wireless power transmitter, the wireless power transmitter terminates power transfer and returns to probing its surface periodically. The wireless power transmitter also executes a metal object detect algorithm and on detection of foreign metal object, asserts a metal object alarm and aborts power transfer if suitable user intervention is not observed in a certain interval of time. While in foreign metal object detected state, the wireless power transmitter periodically checks for removal of foreign metal object from the surface of wireless power transmitter. On detection of removal of foreign metal object, the wireless power transmitter returns to probing its surface periodically. The wireless power transmitter also terminates the power transfer when receiving messages from wireless power receiver to stop the power transfer. As before, the wireless power transmitter periodically checks for removal of portable device containing wireless power receiver from the surface of wireless power transmitter and on removal, returns to probing its surface periodically.

In a first embodiment of the method disclosed herein, on powering up, the wireless power receiver uses its internal operational and circuit characteristics such as current, voltage, frequency, phase difference to detect the level of magnetic flux coupling between the transmitter coil and the receiver coil. Based on the level of magnetic flux coupling and power drawn by downstream load, the wireless power receiver communicates messages via the modulator/demodulator block to the wireless power transmitter. The wireless power receiver may optionally adjust its impedance network, its rectifier topology and its rectifier's switched-capacitor/charge-pump/boost circuitry configuration to compensate for the level of magnetic flux coupling.

In a second embodiment of the method disclosed herein, the wireless power transmitter does not detect the level of magnetic flux coupling between the transmitter coil and the receiver coil(s). Instead, the wireless power transmitter configures its circuitry and operating limits based on type, number and rated power requirements of the wireless power receiver(s). As a result, based on the level of magnetic flux coupling, the wireless power receiver(s) may receiver power in excess or below the power drawn by the downstream load. In such cases, in addition to communicating messages to the wireless power transmitter to increase or decrease the transmitted power, the wireless power receiver(s) dynamically adjust their impedance networks and their rectifier circuitry to regulate their received power to match the power requirements of the downstream load.

To avoid a heated metal object safety issue caused by induced eddy currents when metal objects are placed in the magnetic flux coupling zone of the wireless power transmitter while the wireless power system is delivering power to the downstream load, the wireless power transmitter disclosed herein implements a metal object detect algorithm that is sensitive to wireless power receiver positional changes and wireless power system downstream load changes to effectively enable the wireless power system to detect such misplaced metal objects.

In an embodiment of the wireless power receiver, to protect the wireless power receiver circuitry from induced voltage spikes in excess of defined thresholds, the wireless power receiver disclosed herein includes a simple protection circuitry that naturally turns on and siphons out the excess power when the defined threshold is exceeded.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
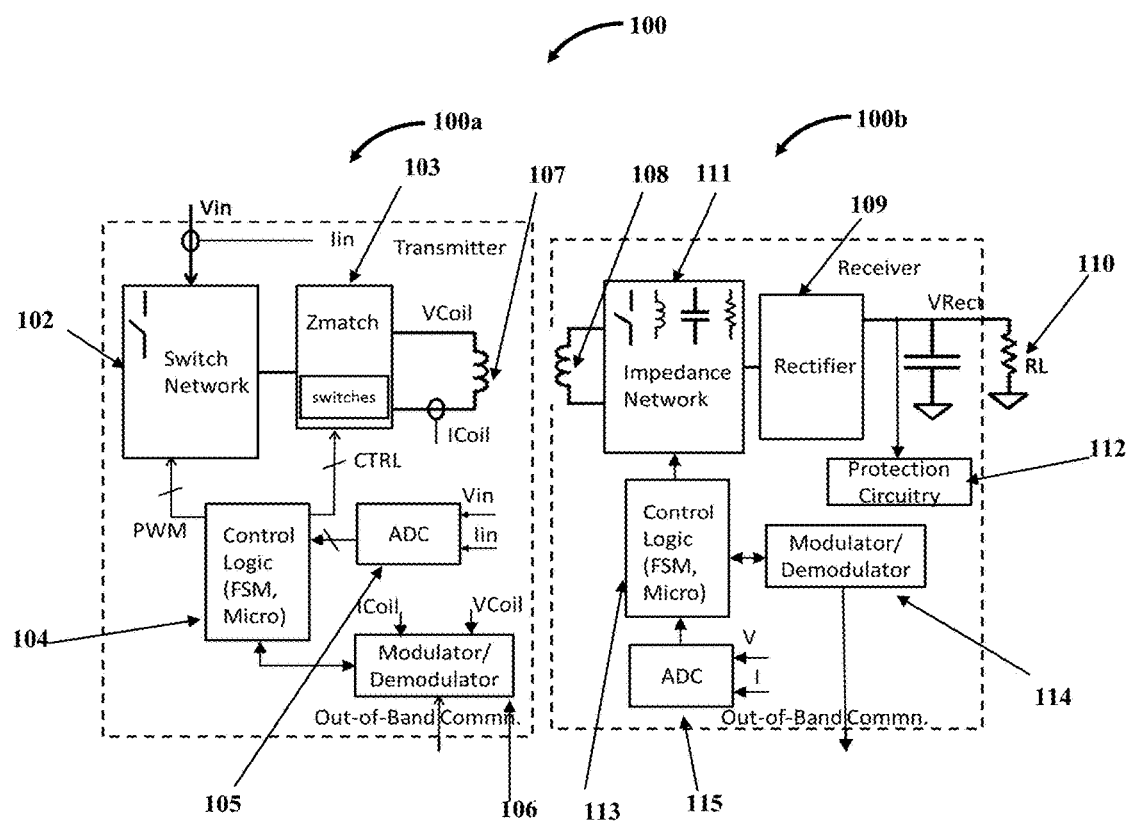
FIG. 1 exemplarily illustrates a schematic diagram of a wireless power system comprising the wireless power transmitter and the wireless power receiver configured to deliver stable wireless power to the downstream load in planar mode, orthogonal mode and intermediate mode.

FIG. 1 exemplarily illustrates a schematic diagram of a wireless power system 100 comprising a wireless power transmitter 100a that provides power to a wireless power receiver 100b. The wireless power transmitter 100a generates an electromagnetic field to a coupling region for providing energy transfer to the wireless power receiver 100b. The wireless power transmitter 100a disclosed herein reconfigures itself to transmit a safe amount of power that is sufficient for the wireless power receiver 100b to deliver its rated power to its downstream load even when the respective coil circuitry are rotationally misaligned.

The wireless power transmitter 100a disclosed herein comprises a first circuit, a second circuit, a third circuit and a transmitter coil. The first circuit includes a switch network 102 as exemplarily illustrated in FIG. 1. The first circuit receives an input voltage Vin and current Iin from an external power source. In an embodiment, the first circuit includes a DC-DC power conversion block that is connected between the external power source and the switch network 102. The power conversion block is configured in one of multiple topologies such as buck, boost, buck-boost, etc., wherein the power conversion block, based on signals supplied to the first circuit from the third circuit, modifies the input DC voltage to higher value (step-up) or lower value (step-down) or leaves it unchanged (pass-through). In a second embodiment, the power conversion block may be configured as an AC-DC power supply where the external power supply is the AC mains and the power conversion block transforms the input AC mains power to a regulated DC voltage based on signals supplied to the first circuit from the third circuit.

The switch network 102 operates with the modified voltage from the power conversion block. If the power conversion block is not included, the switch network 102 operates with the input voltage Vin and current Iin from the external power source. The switch network 102 is configured as an inverter in one of multiple inverter topologies, for example, a half bridge inverter topology, a full bridge inverter topology, a class D inverter topology, a class E inverter topology, etc. The switch network 102 comprises transistors that are configured to change a state, for example, into an on state or an off state, based on signals supplied to the switch network 102 from the third circuit. In an embodiment, the switch network 102 is configured as a direct AC-AC converter where the switch network 102 is directly fed with the AC mains power or with AC mains power post-rectification but with significant DC bus voltage ripple. In such an AC-AC converter, the switch network 102 is configured in one of half bridge and full bridge topologies. Based on signals from the third circuit, the transistors in the switch network 102 are activated in synch with the voltage direction of the AC mains power. The AC mains power is effectively injected into the tank circuitry that is downstream of the switch network.

The second circuit is configured as a variable matching circuit 103, exemplarily illustrated as a "Zmatch" block in FIG. 1. The second circuit 103 comprises one or more of passive electronic components, for example, a resistor, a capacitor, an inductor, a transformer, a magnetic device, a transducer, etc.; active electronic components, for example, a diode, a transistor such as a metal oxide semiconductor field effect transistor (MOSFET), a bipolar transistor, etc., operational amplifiers, an optoelectronic device, directional coupler, etc., and electronic switches. These electronic components in combination are utilized for biasing and regulating the power transmitted to the wireless power receiver 100b. The second circuit 103 is connected between the switch network 102 and a transmitter coil 107. In an embodiment, the second circuit includes a variable tuning circuit that is connected between the variable matching circuit and the transmitter coil. The tuning circuit comprises one or more passive electronic components, for example, a resistor, a capacitor, an inductor, a magnetic device, a transducer, etc.; active electronic components, for example, a diode, a transistor such as a metal oxide semiconductor field effect transistor (MOSFET), a bipolar transistor, etc., operational amplifiers, an optoelectronic device, directional coupler, etc., and electronic switches. Based on signals supplied to the second circuit from the third circuit, the tuning circuit adjusts its circuitry to improve wireless power delivery such as higher efficiency at the wireless power system's 100 operating frequency via activating and/or deactivating switches to include and/or exclude certain of its components into the wireless power transmitter's 100a operation.

The transmitter coil 107 is configured to wirelessly transmit power to the wireless power receiver 100b. The transmitter coil 107 is used for inducing an electromagnetic field to a coupling region for providing energy transfer to the wireless power receiver 100b. The wireless power transmitter 100a transmits power to the wireless power receiver 100b by creating the required electromagnetic field using the transmitter coil 107. In an embodiment, the wireless power transmitter contains a plurality of transmitter coils 107 and switches where one or more transmitter coils may be activated to wirelessly transmit power to the wireless power receiver 100b. The transmitter coil is included in the wireless power transmitter 100a operation by activating the associated switch. The switch is activated based of signals from the third circuit.

The third circuit consists of control logic block 104, an analog to digital converter (ADC) 105 and a modulator/demodulator block 106. The control circuit 104 is configured as, for example, a state machine, a microcontroller, etc., of the wireless power transmitter 100a. Analog input signals are converted to digital signals by an analog to digital converter (ADC) 105 operably coupled to the control logic circuit 104 of the wireless power transmitter 100a. The output signal of the ADC 105 is fed to the control logic circuit 104. The modulator/demodulator block 106 senses, filters and decodes messages from the wireless power receiver 100b. The output of the modulator/demodulator block 106 is also fed to the control logic circuit 104. The third circuit is aware of important dynamic circuit characteristics such as current and voltage in the internal circuitry of the wireless power transmitter 100a via the ADC block 105. The ADC block 105 measures various circuit characteristics such as input current (Iin) and voltage (Vin) from the external power source, the voltage and current in the transmitter coil(s) 107, the voltage and current in the second circuit, etc. The third circuit includes specialized logic in the control logic circuit 104 to measure the phase difference between currents and voltages in the internal circuitry of the wireless power transmitter 100a such as in its transmitter coil 107. The third circuit is aware of important dynamic power characteristics of the wireless power receiver 100b via communicated messages from the wireless power receiver 100b. The messages from the wireless power receiver 100b may be received in-band or out-of-band with respect to the wireless power transfer. The modulator/demodulator block 106 in the third circuit processes and deciphers these messages and provides the information received from the wireless power receiver 100b to the control logic circuit 104. The control logic circuit 104 of the third circuit combines information from the ADC block 105, information from its own specialized phase difference logic and information from the modulator/demodulator block 106 to sense the level of magnetic flux coupling between the coils of the wireless power transmitter 100a and wireless power receiver 100b. The control logic circuit 104 of the third circuit appropriately configures the first circuit, second circuit, transmit coil and input voltage to switch network 102 to ensure that a sufficient amount of power is transmitted to the wireless power receiver 100b effectively compensating for the rotational misalignment that may exist between the coils of the wireless power transmitter 100a and wireless power receiver 100b. To compensate for the rotational misalignment and magnetic flux coupling, the control logic circuit 104 may drive signals to the switch network 102 to change to an appropriate topology; it may drive the PWM signal to the switch network 102 adhering to the appropriate frequency and duty cycle ranges. The control logic circuit 104 may enable/disable electronic components in the variable matching circuit 103 using general purpose input/outputs (GPIOs) and switches. The control logic circuit 104 may drive appropriate signals to the power conversion block to adjust the input voltage to the switch network 102. The control logic circuit 104 may additionally drive appropriate signals to the tuning circuit to adjust its circuit characteristics to improve wireless power delivery. The control logic circuit 104 may also enable appropriate switches activate appropriate transmitter coil(s) from a plurality of coils for effective wireless power transmission to the wireless power receiver 100b.

The wireless power receiver 100b disclosed herein includes the receiver coil 108, impedance network 111, rectifier 109, protection circuitry 112, control logic 113, modulator/demodulator block 114 and ADC block 115. In an embodiment, the wireless power receiver 100b includes a voltage regulation block such as an LDO (Low-Dropout Regulator), buck, boost or buck-boost circuitry between the rectifier 109 and the downstream load (RL) 110 to provide regulated output power to the downstream load (RL) 110. The wireless power receiver 100b receives wireless power from the wireless power transmitter 100a via the receiver coil 108. The amount of wireless power received is controlled via the impedance network 111. The impedance network 111 comprises one or more of passive electronic components, active electronic components, transformers and electronic switches. The impedance of the impedance network 111 can be modified by enabling or disabling various electronic components. The rectifier 109 conditions the alternating-current (AC) wireless power into direct-current (DC) wireless power. The rectifier 109 comprises one or more of passive electronic components, active electronic components and electronic switches. The rectifier 109 is configured in one of multiple topologies, for example, an asynchronous rectifier topology, a half-synchronous rectifier topology, a fully synchronous rectifier topology, a voltage multiplier topology, etc. In a first embodiment, by enabling/disabling appropriate switches, the topology of the rectifier 109 can be dynamically selected from one of asynchronous, half-synchronous, fully synchronous and voltage multiplier topologies. In a second embodiment, the rectifier 109 may further include one of a switched-capacitor/charge-pump circuit and a boost circuit to further increase the DC voltage, post initial AC-DC rectification. The protection circuitry 112 monitors critical dynamic current and voltage characteristics in the internal circuitry of the wireless power receiver 100b such as the rectified voltage VRect, and takes rapid evasive action if the circuit characteristics are not within acceptable bounds. The protection circuitry 112 comprises one or more of passive electronic components, active electronic components and electronic switches. Analog input signals are converted to digital signals by an analog to digital converter (ADC) 115 operably coupled to the control logic circuit 113 of the wireless power receiver 100b. The ADC block 115 measures important dynamic circuit characteristics in the internal circuitry of the wireless power receiver 100b such as the downstream load (RL) current, rectified voltage VRect, etc. The control circuit 113 is configured as, for example, a state machine, a microcontroller, etc., of the wireless power receiver 100b. The control logic 113 is aware of the power drawn by the downstream load (RL) 110 via the ADC block 115. Based on the power drawn by the downstream load (RL) 110, the control logic 113 communicates messages via the modulator/demodulator block 114 to the wireless power transmitter 100a to stop, maintain, increase or decrease the amount of wireless power transmitted. These messages help the wireless power system robustly regulate the power delivery to match the needs of the downstream load in the wireless power receiver 100b. The modulator/demodulator block 114 may send these messages in-band or out-of-band with respect to the wireless power transfer. The control logic 113 also communicates additional messages via the modulator/demodulator block 114 to the wireless power transmitter 100a regarding the dynamic total power absorbed into the wireless power receiver 100b. This information helps the wireless power system 100 detect the presence of extraneous foreign metal objects in the magnetic flux coupling zone of the wireless power transmitter 100a. When an extraneous foreign metal object is detected, the wireless power system 100 asserts an alarm and/or aborts the power transfer. Thus, in addition to effective power delivery, these messages from the wireless power receiver's 100b to the wireless power transmitter 100a help ensure the safety of the power transfer.

In a first embodiment of the wireless power receiver, the control logic 113 combines the information received from the ADC block 115 with dynamic operational characteristics such as the frequency and duty cycle of wireless power that it measures via its specialized logic to sense the level of magnetic flux coupling between the coils of the wireless power transmitter 100a and wireless power receiver 100b. Based on the level of magnetic flux coupling and the power drawn by the downstream load (RL) 110, the control logic 113 communicates messages via the modulator/demodulator block 114 to the wireless power transmitter 100a to stop, maintain, increase or decrease the amount of wireless power transmitted. The control logic circuit 113 may additionally update the impedance of the impedance network 111, the topology of the rectifier 109 and the inclusion and configuration of the switched-capacitor/charge-pump/boost circuit of the rectifier 109 to further compensate for the level of magnetic flux coupling between the coils of the wireless power transmitter 100a and wireless power receiver 100b. The level of magnetic flux coupling between the coils may be impacted by rotational misalignment between the coils. The control logic circuit 113 changes the impedance of the impedance network 111 by enabling/disabling electronic components in the impedance network 111 via general purpose input/outputs (GPIOs) and switches. The control logic circuit 113 drives appropriate signals to the rectifier 109 to adjust its topology and switched-capacitor/charge-pump/boost circuit so as to enable sufficient and efficient power delivery for the level of magnetic flux coupling.

In a second embodiment of the wireless power receiver, the control logic 113 dynamically adjusts the impedance networks 111 and rectifier 109 in FIG. 1 to regulate their received power to match the power requirements of the downstream load. The control logic 113 is not aware of the level of magnetic flux coupling and makes these adjustments dynamically as power is being drawn by the downstream load. If the received power is still not sufficient or if it is in excess, the wireless power receiver 100b sends messages to the wireless power transmitter 100a to increase or decrease the transmitted power appropriately.

In an embodiment of the wireless power system and method disclosed herein, the entire or a significant portion of the wireless power receiver circuitry 100b is integrated into a non-critical area of the portable device. This non-critical area of the portable device is a different location on the portable device away from the vital area of the portable device where critical circuitry such as the camera module, display module, heart rate sensor, skin temperature sensor and other sensors are contained in the portable device. As a result, by construction, the wireless power receiver circuitry 100b is configured to not eat into the critical space that is better used for sensitive sensors and modules. By virtue of physical separation, the wireless charging system would have little or reduced impact on the performance of those sensors and modules; and vice versa, the sensors and modules will also not impact or will have reduced impact on the performance of the wireless charging system. While integrating the wireless power receiver circuitry into such a non-critical area may be attractive from a portable device sensors/modules perspective, it may pose significant challenges to the delivery of wireless power from the wireless power transmitter 100a to the wireless power receiver 100b due to reduced magnetic flux coupling via increased rotational misalignment, Z-vertical-height separation, etc. By virtue of its capability to sense and recognize the level of coupling, the wireless power system and method disclosed herein can suitably address those challenges.

The portable device by design may not include any sensors and/or modules. Alternately, the portable device by design and/or construction may include only sensors and/or modules that are not sensitive to wireless power circuitry presence and operation. In such a scenario, the sensors and/or modules may co-exist with the wireless charging receiver circuitry in the same location such as in the back of the watch. In an embodiment of the wireless power system 100 and method disclosed herein, the entire portion of the wireless power receiver 100b circuitry is integrated in close proximity to the sensors and/or modules in the vital area of the portable device.

In another embodiment of the wireless power system disclosed herein, the wireless power receiver's 100b receiver coil 108 alone is integrated into the strap or frame of the smart watch, fitness tracker, smart glass, smart clothing or other smart wearable device. The remaining wireless power receiver circuitry is located in a different part of the Wearable device and may be in close proximity to the sensors and modules.

The wireless power receiver's receiver coil 108 is usually made of fine wire gauge multi-turn copper or other suitable metal. In an embodiment, the receiver coil 108 is fabricated via a process such as etching, printing, lithography, etc., directly into the portable device. The coil may be formulated on a hard substrate or a flexible substrate. The receiver coil 108 is fabricated into a component of the portable devices such as the body, the strap, the frame, etc. These components are manufactured and procured with the receiver coil 108 integrated natively.

Figure 2:
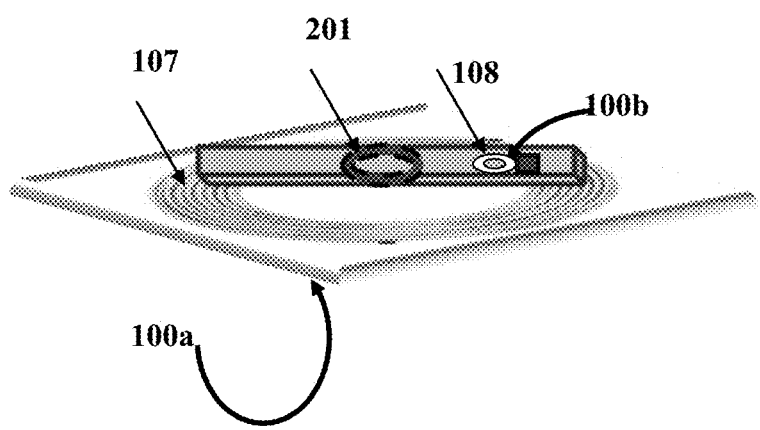
FIG. 2 exemplarily illustrates planar mode of wireless power delivery where the (smart watch like) Wearable device is placed on the wireless power transmitter in a manner such that transmitter coil and receiver coil are parallel to each other.

As exemplarily illustrated in FIG. 2, the strap (or frame) of the portable device 201 containing the receiver coil 108 may be placed flat on the wireless power transmitter coil 107 such that the transmitter coil 107 and receiver coil 108 are parallel and on top of each other. Such an alignment between the transmitter coil 107 and receiver coil 108 where both coils are separated but in parallel planes is referred herein as the planar mode. In such a placement of the device on the charger, there is no rotational misalignment between the wireless power receiver's 100b receiver coil 108 and the wireless power transmitter's 100a transmitter coil 107.

Figure 3:
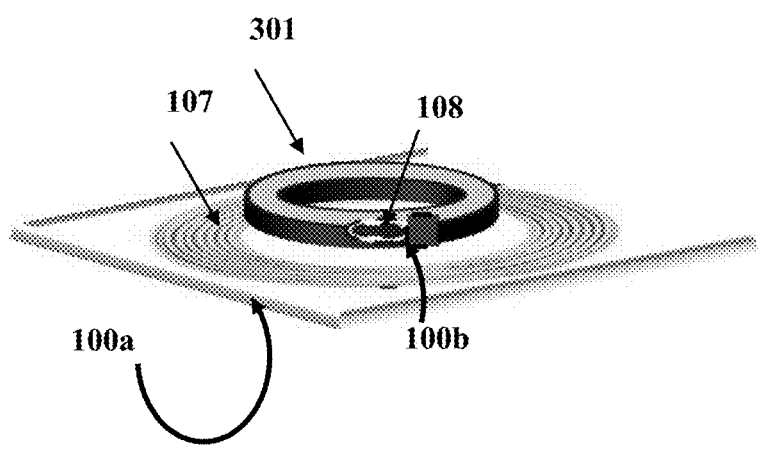
FIG. 3 exemplarily illustrates orthogonal mode of wireless power delivery where the (fitness tracker like) Wearable device is placed on the wireless power transmitter in a manner such that transmitter coil and receiver coil are perpendicular to each other.

As exemplarily illustrated in FIG. 3, the portable device 301 may be placed on the wireless power transmitter coil 107 such that the transmitter coil 107 and receiver coil 108 are perpendicular to each other. The transmitter coil 107 is in the XY plane and the receiver coil 108 is in the Z-plane. Such an alignment between the transmitter coil 107 and receiver coil 108 is referred herein as the orthogonal mode. In such a placement of the device on the charger, there is a 90 degrees rotational misalignment between the wireless power receiver's 100b receiver coil 108 and the wireless power transmitter's 100a transmitter coil 107.

Figure 4:
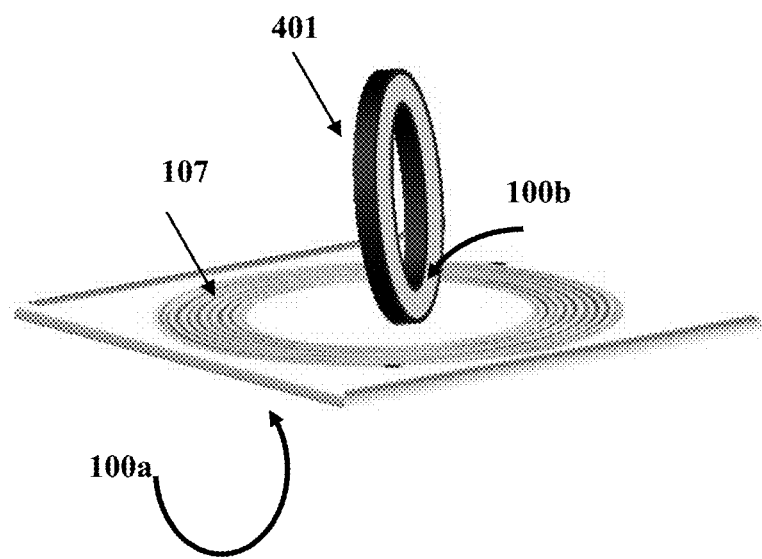
FIG. 4 exemplarily illustrates an intermediate mode (between planar mode and orthogonal mode) of wireless power delivery where the (fitness tracker like) Wearable device is placed on the wireless power transmitter in a manner such that the transmitter coil is in the XY plane while the receiver coil arcs above it following the contour of the Wearable device. The receiver coil is neither parallel nor orthogonal to the transmitter coil but at an angle in between 0 degrees (planar) and 90 degrees (orthogonal).

As exemplarily illustrated in FIG. 4, the portable device 401 may be placed on the wireless power transmitter coil 107 such that the transmitter coil 107 and receiver coil 108 are neither orthogonal nor planar but in an intermediate mode. The receiver coil 108 is integrated along the circumference of the device. The transmitter coil 107 in the XY plane and the receiver coil 108 in the XYZ-plane. Such an alignment between the transmitter coil 107 and receiver coil 108 is referred herein as intermediate mode as it is in between planar and orthogonal. In such a placement of the device on the charger, the rotational misalignment between the wireless power receiver's 100b receiver coil 108 and the wireless power transmitter's 100a transmitter coil 107 is between 0 degrees and 90 degrees. The magnetic flux coupling characteristics between the transmitter coil 107 and receiver coil 108 are very different in these modes. The wireless power system disclosed herein recognizes the level of magnetic flux coupling and dynamically configures itself to deliver stable wireless power as drawn by the load 110 in these different modes.

The wireless power transmitter 100a generates an electromagnetic field in a coupling region for providing energy transfer to the wireless power receiver 100b. When the wireless power receiver 100b is placed on the wireless power transmitter 100a, a portion of the magnetic flux emanating from the transmitter coil 107 travels through the receiver coil 108. Based on the separation and rotational misalignment between the receiver coil 108 and transmitter coil 107, the amount of magnetic flux intersecting and coupling into the receiver coil 108 varies. When the device is placed on the charger, the rotational alignment between the coils may be in planar mode or in orthogonal mode or in an intermediate mode. The magnetic flux coupling characteristics in the wireless power receiver 108 are different for each of these modes. In addition, in each of these modes, based on the separation in the X-plane, Y-plane and Z-plane between the centers of the transmitter coil 107 and receiver coil 108, the magnetic flux coupling characteristics in the wireless power receiver coil 108 further varies. The wireless power system 100 and method disclosed herein senses and communicates the level of magnetic flux coupling at the wireless power receiver coil 108 under the different scenarios. The wireless power system 100 dynamically reconfigures one or more of the elements in the first circuit, second circuit and third circuit of the wireless power transmitter 100a and/or one or more of the elements in the impedance network 111 and rectifier 109 of the wireless power receiver 100b to deliver stable wireless power as drawn by the load 110 that is downstream of the wireless power receiver 100b in the device.

Figure 5A:
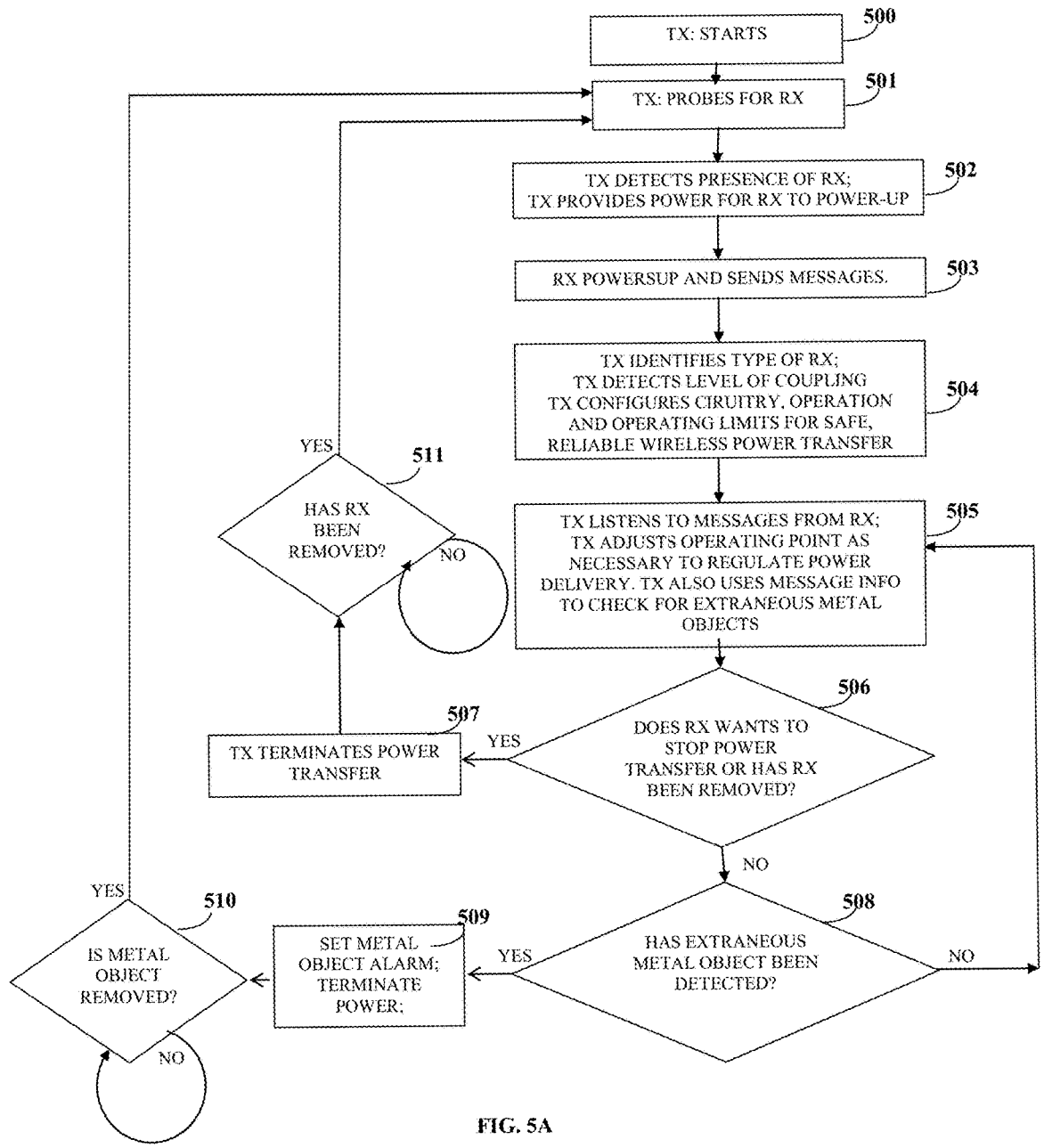
FIG. 5A exemplarily illustrates a flow chart comprising the steps for sufficiently and safely delivering wireless power from the wireless power transmitter to the wireless power receiver where the wireless power transmitter is alone cognizant of the level of magnetic flux coupling between the transmitter coil and receiver coil.

FIG. 5A exemplarily illustrates a flow chart comprising the steps for establishing a sufficient and safe wireless power transfer from the wireless power transmitter 100a to the wireless power receiver 100b when the portable device containing the wireless power receiver 100b is placed on the charger in one of planar, orthogonal and intermediate modes. The magnetic flux coupling between transmitter coil 107 in the charger and receiver coil 108 in the device would vary widely based on the rotational misalignment and the separation in the X-plane, Y-plane and Z-plane between the transmitter coil 107 and receiver coil 108. The wireless power transmitter 100a is cognizant of the level of magnetic flux coupling at the wireless power receiver coil 108 under these scenarios and includes the necessary capabilities to configure its circuitry and operation to adjust to the level of coupling. At startup 500, the wireless power transmitter 100a is provided power and the wireless power transmitter 100a probes its surface periodically 501 for the presence of a wireless power receiver 100b. When a device containing the wireless power receiver 100b is placed on top of the wireless power transmitter 100a, the wireless power transmitter 100a detects the presence of a receiver and provides initial power for the wireless power receiver 100b to power-up 502. The wireless power receiver 100b powers up and starts sending messages 503 to the wireless power transmitter 100a. From the communicated messages 504, the wireless power transmitter 100a learns about the wireless power receiver 100b such as its type, capabilities and internal circuit characteristics such as initial voltage. Combining this information with the operational and circuit characteristics in the internal circuitry such as current, voltage, frequency, phase difference, etc., the wireless power transmitter 100a detects the level of coupling between transmitter coil 107 and receiver coil 108. Based on the identity of the wireless power receiver 100b and the level of coupling, the wireless power transmitter 100a configures its circuitry and operating limits 504 to ensure safe and sufficient wireless power transfer. The wireless power transmitter 100a then continues to listen to messages from the wireless power receiver 100b and adjusts its operating point to deliver the required power 505. During the power transfer, if the device is removed from the surface of the wireless power transmitter 100a, then the wireless power transmitter 100a terminates the power transfer 507, confirms the removal 511 and returns to the initial probe state 501 where it checks the surface periodically for the placement of a wireless power receiver 100*b* contained in the portable device. During the power transfer, if the wireless power transmitter 100*a* receives messages to stop the power transfer 506, then the wireless power transmitter 100*a* ends the power transfer 507. After power transfer termination, the wireless power transmitter 100*a* periodically checks for the removal of the wireless power receiver 100*b* from the surface of the wireless power transmitter 100*a*. When the wireless power receiver 100*b* is removed 511, the wireless power transmitter 100*a* returns to the initial probe state 501 where it checks the surface periodically for the placement of a wireless power receiver 100*b* contained in the portable device.

In the flowchart exemplarily illustrated in FIG. 5A, in addition to messages that help regulate the power transfer, the wireless power transmitter 100*a* also receives messages from the wireless power receiver 100*b* that help the wireless power system detect the presence of foreign metal objects 505 in the magnetic flux coupling zone of the wireless power transmitter 100*a*. For this purpose, the wireless power receiver 100*b* computes the total dynamic power that it is receiving and communicates this information to the wireless power transmitter 100*a*. The wireless power transmitter 100*a* combines this received power information with other internal circuit and operational data 508 as exemplarily illustrated by the flowchart in FIG. 6 to detect the presence of extraneous foreign metal objects. When an extraneous foreign metal object is detected, the wireless power system 100 asserts a metal object alarm 509. The wireless power system 100 additionally aborts the power transfer 509 if suitable user intervention is not observed within a certain interval of time. Once the power is terminated, the wireless power transmitter 100*a* periodically checks for the removal of the metal object 510 from the surface of the wireless power transmitter 100*a*. When the metal object is removed 510, the wireless power transmitter 100*a* returns to the initial probe state 501 where it checks the surface periodically for the placement of a wireless power receiver 100*b* contained in a portable device.

Figure 5B:
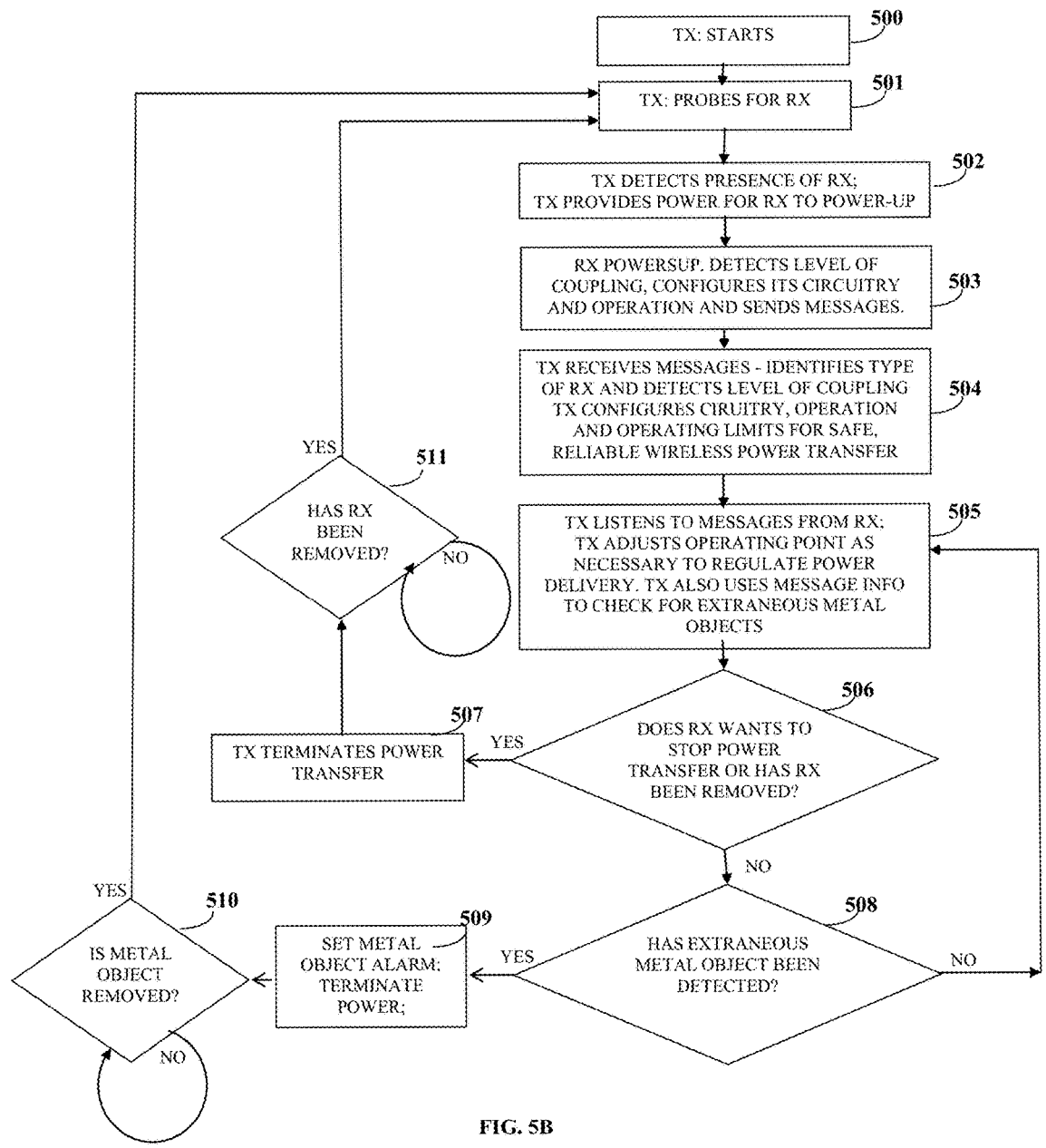
FIG. 5B exemplarily illustrates a flow chart comprising the steps for sufficiently and safely delivering wireless power from the wireless power transmitter to the wireless power receiver where both the wireless power transmitter and the wireless power receiver are cognizant of the level of magnetic flux coupling and may configure their respective circuitry and operation to adjust for the level of coupling.

The method exemplarily illustrated by the flow chart in FIG. 5B is a variation on the method exemplarily illustrated by the flow chart in FIG. 5A. Both FIG. 5A and FIG. 5B comprise the steps for establishing a sufficient and safe wireless power transfer from the wireless power transmitter 100*a* to the wireless power receiver 100*b* when a portable device containing the wireless power receiver 100*b* is placed on the charger in one of planar, orthogonal and intermediate modes. The magnetic flux coupling between transmitter coil 107 in the charger and receiver coil 108 in the device would vary widely based on the rotational misalignment and separation in the X-plane, Y-plane and Z-plane between the transmitter coil 107 and receiver coil 108. In the method exemplarily illustrated by the flow chart in FIG. 5A, only the wireless power transmitter 100*a* is cognizant of the level of magnetic flux coupling; the wireless power transmitter 100*a* alone configures its circuitry and operation to adjust to the level of coupling. In the method exemplarily illustrated by the flow chart in FIG. 5B, both the wireless power transmitter 100*a* and the wireless power receiver 100*b* are cognizant of the level of magnetic flux coupling. Both the wireless power transmitter 100*a* and the wireless power receiver 100*b* may configure their circuitry and operation to adjust to the level of coupling. At startup 500, the wireless power transmitter 100*a* is provided power and the wireless power transmitter 100*a* probes its surface periodically 501 for the presence of a wireless power receiver 100*b*. When the device containing the wireless power receiver 100*b* is placed on top of the wireless power transmitter 100*a*, the wireless power transmitter 100*a* detects the presence of a receiver and provides initial power for the wireless power receiver 100*b* to power-up 502. The wireless power receiver 100*b* powers up and detects the level of coupling based of internal operational and circuit characteristics such as current, voltage, frequency, phase difference, etc., in the internal circuitry. The wireless power receiver 100*b* adjusts its circuitry to compensate for the level of coupling and starts sending messages 503 to the wireless power transmitter 100*a*. From the communicated messages, the wireless power transmitter 100*a* learns about the wireless power receiver 100*b* such as its type, capabilities and internal circuit characteristics such as initial voltage. Combining this information with the operational and circuit characteristics in the internal circuitry such as current, voltage, frequency, phase difference, etc., the wireless power transmitter 100*a* detects the level of coupling between transmitter coil 107 and receiver coil 108. Based on the type of the wireless power receiver 100*b* and the level of coupling, the wireless power transmitter 100*a* configures its circuitry, operation and operating limits 504 to ensure safe and sufficient wireless power transfer. The remainder of the steps contained in the flow chart exemplarily illustrated in FIG. 5B are identical to that in FIG. 5A.

Figure 5C:
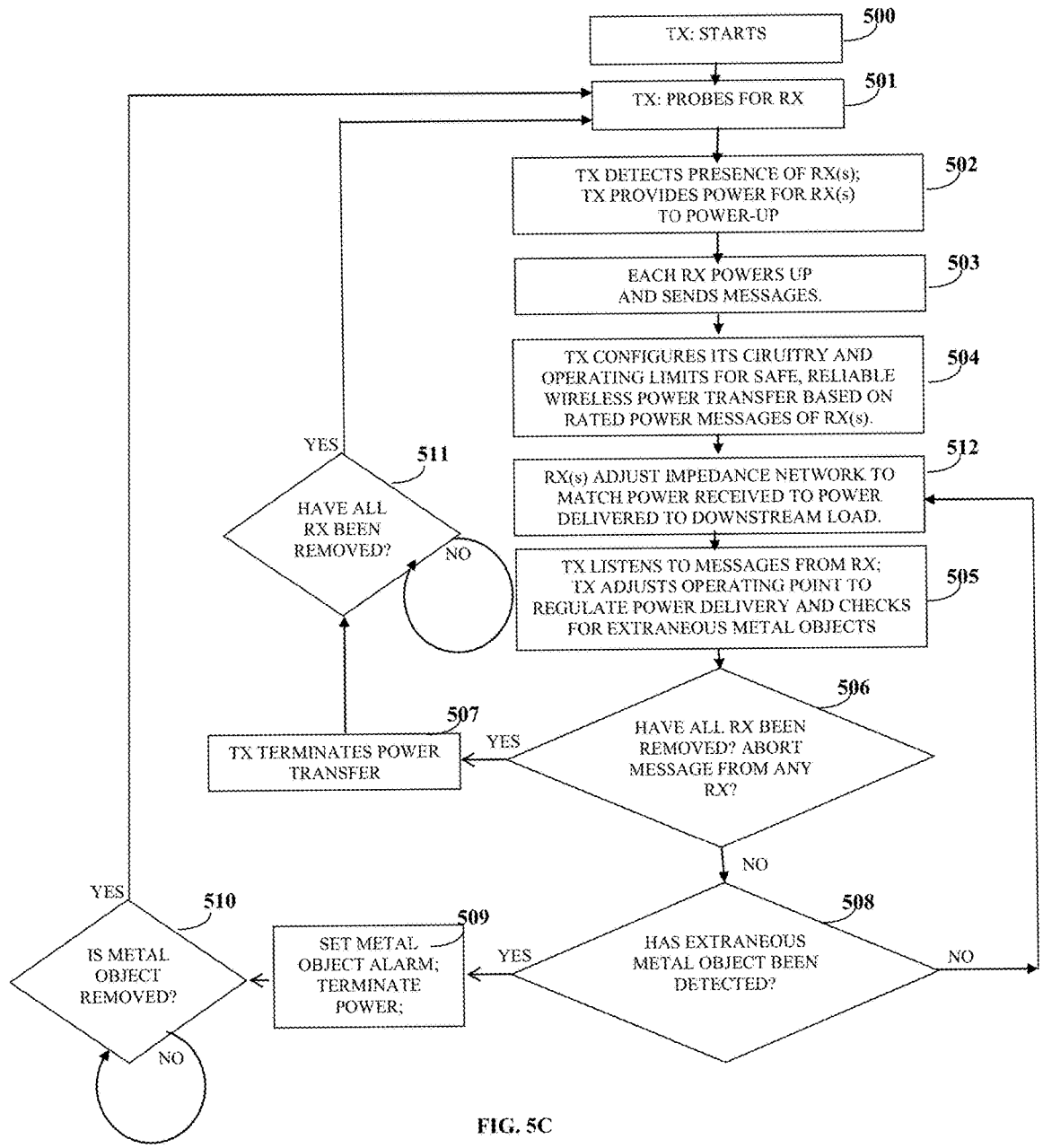
FIG. 5C exemplarily illustrates a flow chart comprising the steps for sufficiently and safely delivering wireless power from the wireless power transmitter to multiple wireless power receivers.

FIG. 5C exemplarily illustrates a flow chart comprising the steps for establishing a sufficient and safe wireless power transfer from a wireless power transmitter 100*a* to one or more wireless power receivers 100*b* when one or more portable devices containing a wireless power receiver 100*b* each are placed on the charger in one of planar, orthogonal and intermediate modes. The magnetic flux coupling between transmitter coil 107 in the charger and receiver coils 108 in the devices would vary widely based on the rotational misalignment and the separation in the X-plane, Y-plane and Z-plane between the transmitter coil 107 and receiver coils 108. At startup 500, the wireless power transmitter 100*a* is provided power and the wireless power transmitter 100*a* probes its surface periodically 501 for the presence of a wireless power receiver 100*b*. When one or more devices containing the wireless power receiver 100*b* is placed on top of the wireless power transmitter 100*a*, the wireless power transmitter 100*a* detects the presence of a receiver and provides initial power for the wireless power receivers 100*b* to power-up 502. The wireless power receivers 100*b* power up and start communicating 503 and from the communicated messages, the wireless power transmitter 100*a* determines the type, number and rated power requirements of the wireless power receivers 100*b*. Based on this information from the wireless power receivers 100*b*, the wireless power transmitter 100*a* configures its circuitry and operating limits 504 for sufficient and safe wireless power transfer. The wireless power transmitter 100*a* then continues to listen to messages from the wireless power receiver 100*b* and adjusts its operating point to deliver the required power 505. In the flowchart exemplarily illustrated in FIG. 5C, the wireless power transmitter 100*a* does not sense the level of magnetic flux coupling with the wireless power receivers 100*b*; the wireless power transmitter 100*a* does not configure its circuitry and operation to adjust to the level of coupling unlike the flowchart exemplarily illustrated in FIG. 5A. In the flowchart exemplarily illustrated in FIG. 5C, the wireless power receivers 100*b* do not sense the level of magnetic flux coupling with the wireless power transmitter 100*a*; the wireless power receivers 100*b* do not configure their circuitry and operation to adjust to the level of coupling unlike the flowchart exemplarily illustrated in FIG. 5B. As a result, based on the level of magnetic flux coupling, the wireless power receivers 100b may receive power in excess of the power that they need to meet the power requirements of the downstream load. The wireless power receivers 100b dynamically adjust their impedance networks 111 and rectifier 109 in FIG. 1 to regulate their received power to match the power requirements of the downstream load 512. Alternately, based on the level of magnetic flux coupling, the wireless power receivers 100b may be receiving less power less than needed by them to satisfy the downstream load's requirements. In such a case, the wireless power receivers 100b first dynamically adjust their impedance networks 111 and rectifier 109 in FIG. 1 to increase their received power so as to match the power requirements of the downstream load 512. If the received power is still not sufficient, the wireless power receivers 100b sends messages to the wireless power transmitter 100a to increase the transmitted power.

In the flowchart exemplarily illustrated in FIG. 5C, during the power transfer, if the devices are removed from the surface of the wireless power transmitter 100a, then the wireless power transmitter 100a terminates the power transfer 507, confirms the removal 511 and returns to the initial probe state 501 where it checks the surface periodically for the placement of a wireless power receiver 100b contained in the portable device. During the power transfer, if the wireless power transmitter 100a receives messages to abort the power transfer 506 from any of the wireless power receivers 100b, then the wireless power transmitter 100a ends the power transfer 507. After power transfer termination, depending on its configuration, the wireless power transmitter 100a periodically checks for the removal of one or all of the wireless power receivers 100b from the surface of the wireless power transmitter 100a. When one or all of the wireless power receivers 100b are removed 511, the wireless power transmitter 100a returns to the initial probe state 501 where it checks the surface periodically for the placement of a wireless power receiver 100b contained in the portable device.

In the flowchart exemplarily illustrated in FIG. 5C, in addition to messages that help regulate the power transfer, the wireless power transmitter 100a also receives messages from the wireless power receivers 100b that help the wireless power system detect the presence of foreign metal objects 505 in the magnetic flux coupling zone of the wireless power transmitter 100a. For this purpose, the wireless power receivers 100b communicate to the wireless power transmitter 100a the total dynamic power that they are receiving. The wireless power transmitter 100a combines this information with other internal circuit and operational data 508 as exemplarily illustrated in FIG. 6 to detect the presence of extraneous foreign metal objects. When an extraneous foreign metal object is detected, the wireless power system 100 asserts a metal object alarm 509. The wireless power system 100 additionally aborts the power transfer 509 if suitable user intervention is not observed within a certain interval of time. Once the power is terminated, the wireless power transmitter 100a periodically checks for the removal of the metal object 510 from the surface of the wireless power transmitter 100a. When the metal object is removed 510, the wireless power transmitter 100a returns to the initial probe state 501 where it checks the surface periodically for the placement of a wireless power receiver 100b contained in the portable device.

To avoid a heated metal object safety issue caused by induced eddy currents when metal objects are placed in the magnetic flux coupling zone of the wireless power transmitter 100a, the wireless power transmitter 100a disclosed herein implements a metal object detect algorithm that enables the wireless power system 100 to detect such metal objects. As exemplarily illustrated by the flow chart in FIG. 6, the wireless power transmitter 100a activates its metal object detect algorithm when power transfer is stable 601 between the wireless power transmitter 100a and the wireless power receiver 100b. While in stable power transfer, the wireless power transmitter 100a periodically measures the tank impedance and other circuit characteristics 602. The tank impedance is the impedance seen by the switch network 102 in FIG. 1.

When a metal object is placed on the wireless power transmitter 100a, a change in tank impedance 603 is measured. Such a change in tank impedance is caused by other factors such as change in position of the wireless power receiver 100b, change in power drawn by the downstream load of the wireless power receiver 100b, etc. To eliminate such alternate causes, the wireless power transmitter 100a checks operating and circuit characteristics such as current, voltage, frequency, phase difference, etc., in its internal circuitry. The wireless power transmitter 100a also checks the total dynamic power absorbed messages from the wireless power receiver(s) 100b. If the internal circuit characteristics confirm a substantive increase in the power consumed by the wireless power system 100 that is unsupported by a change in position of the wireless power receiver(s) 100b or change in total dynamic power absorbed by the wireless power receiver(s) 100b, then the tank impedance change is abnormal 604. If the power consumed by the wireless power system is below the substantive threshold or if there has been a change in the position of the wireless power receiver or if the messages from the wireless power receiver(s) indicate a change in the power absorbed, then the metal object detect algorithm accepts the tank impedance change as normal.

If the tank impedance change is normal 604, then the wireless power transmitter 100a continues to periodically measure the tank impedance, operating and circuit characteristics and stores associated messages from the wireless power receiver(s)602. If the tank impedance change is abnormal 604, then the wireless power transmitter 100a enters a foreign metal object detect state 605. The foreign metal object detect state 605 is the same as state 509 described in FIGS. 5A, 5B and 5C. In such a state, the wireless power system 100 asserts a metal object alarm 509. The wireless power system 100 additionally aborts the power transfer 509 if suitable user intervention is not observed within a certain interval of time. Once the power is terminated, the wireless power transmitter 100a periodically checks for the removal of the metal object 510 from the surface of the wireless power transmitter 100a. When the metal object is removed 510, the wireless power transmitter 100a returns to the initial probe state 501 where it checks the surface periodically for the placement of a wireless power receiver 100b contained in the portable device.

In a first embodiment of the metal object detection algorithm, the wireless power transmitter 100a uses the change in the current through the transmitter coil 107 as the criteria in place of the tank impedance. While in stable power transfer, the wireless power transmitter 100a periodically measures the current through the transmitter coil 107. When a metal object is placed on the wireless power transmitter 100a, a change in current through the transmitter coil 107 is measured. As explained previously, if the internal circuit characteristics confirm a substantive increase in the power consumed by the wireless power system 100 that is unsupported by alternate causes, then the change in current through the transmitter coil 107 is abnormal 604 and the wireless power transmitter 100*a* enters the foreign metal object detect state 605.

In a second embodiment of the metal object detection algorithm, the wireless power transmitter 100*a* uses the change in voltage across the transmitter coil 107 as the criteria in place of the tank impedance. While in stable power transfer, the wireless power transmitter 100*a* periodically measures voltage across the transmitter coil 107. When a metal object is placed on the wireless power transmitter 100*a*, a change in voltage across the transmitter coil 107 is measured. As explained previously, if the internal circuit characteristics confirm a substantive increase in the power consumed by the wireless power system 100 that is unsupported by alternate causes, then the change in voltage across the transmitter coil 107 is abnormal 604 and the wireless power transmitter 100*a* enters the foreign metal object detect state 605.

Figure 7:
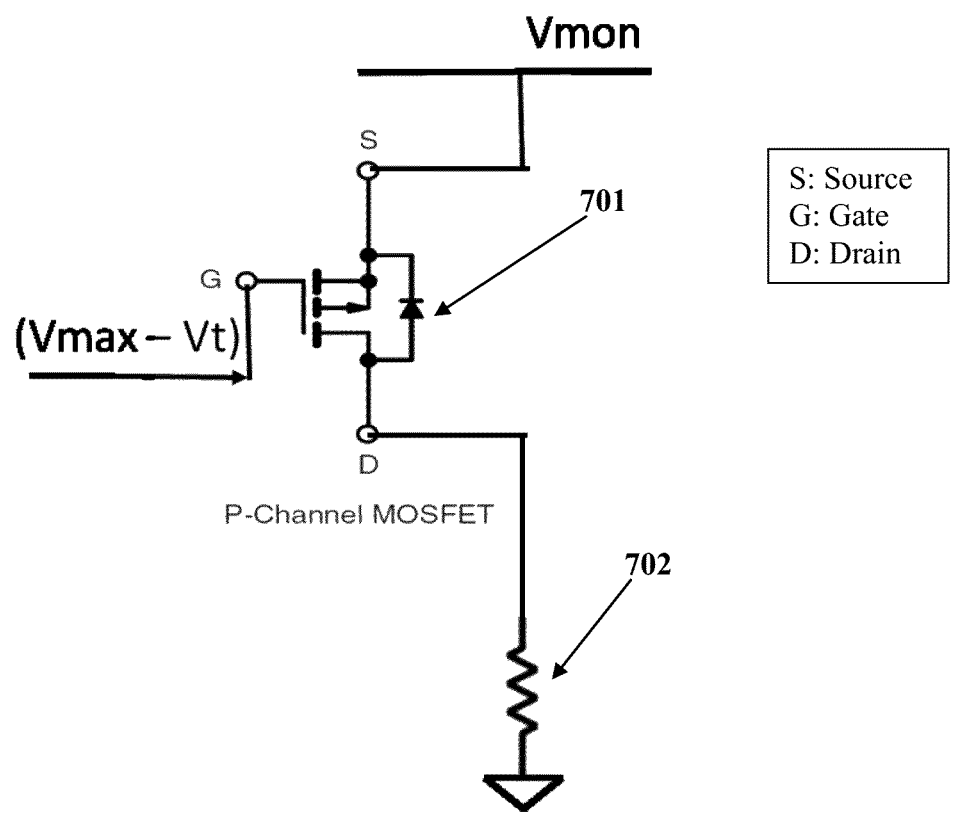
FIG. 7 exemplarily illustrates a schematic diagram of a simple over-voltage protection circuitry that kicks in rapidly when the set threshold is exceeded; it siphons out the excess power helping the system recover to normal voltage levels and operation.

Because of the variations in magnetic flux coupling between the transmitter coil 107 and receiver coil 108, in some scenarios the wireless power receiver 100*b* circuitry may experience short-term voltage and/or current spikes in excess of the permissible maximum thresholds. The wireless power receiver 100*b* disclosed herein includes a simple protection circuitry that naturally turns on and siphons out the excess power when the maximum threshold is exceeded. FIG. 7 exemplarily illustrates a schematic diagram of this over-voltage protection circuitry. In one embodiment, the gate of the p-mosfet transistor 701 is driven with a voltage equal to the maximum allowable voltage for Vmon (the voltage that is being monitored) minus the threshold voltage of the transistor. For example: if the maximum allowable voltage for Vmon is 20V and if the threshold voltage for the p-mosfet transistor is 2V, then the gate of the p-mosfet transistor is driven with 18V. If Vmon voltage exceeds 20V, the p-mosfet transistor 701 would turn on rapidly (without any user intervention) and direct the excess energy to ground. The excess power is thus siphoned off helping the system recover to normal voltage/power levels and operation. This excess power though could potentially damage the switch 701 itself; hence, to limit the current and power surge through the switch 701, a current limiting resistor 702 is added in series in the current path.

Figure 8A:
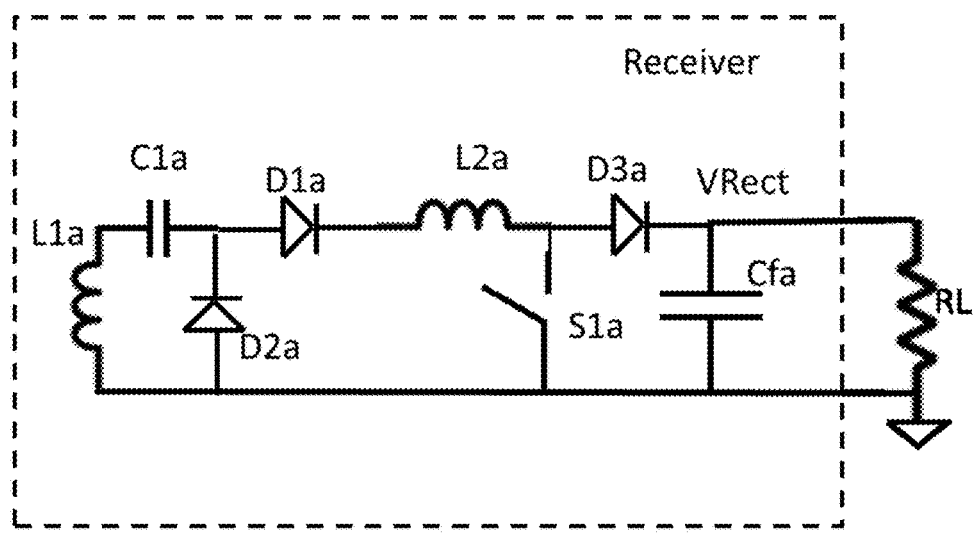
FIG. 8A exemplarily illustrates a first embodiment of the wireless power receiver in the wireless power system disclosed herein, wherein the wireless power receiver includes the capability to effectively compensate for varying scenarios of coupling between the coils of the wireless power transmitter and the wireless power receiver.
Figure 8B:
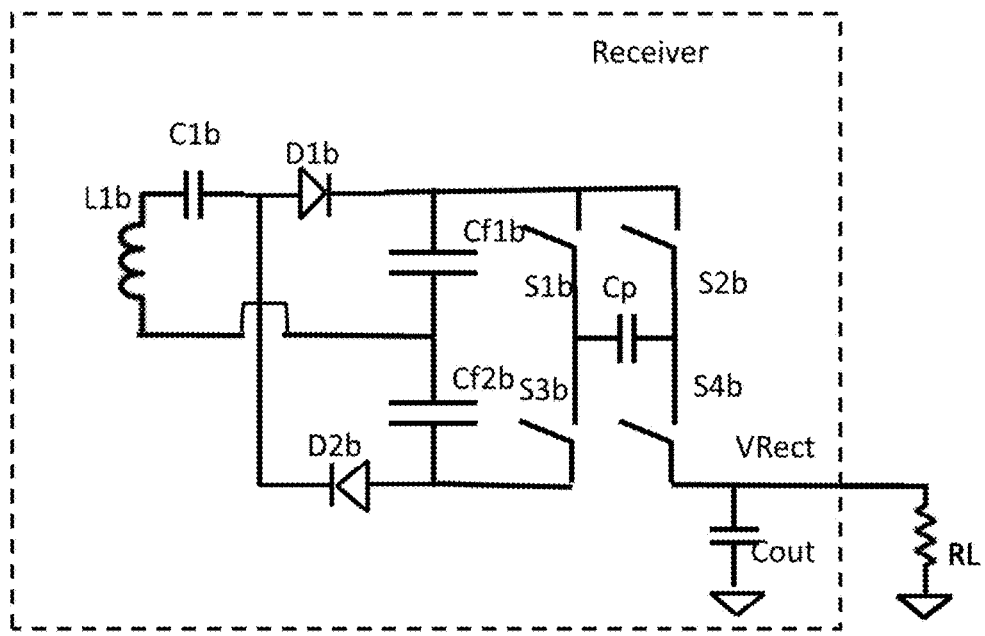
FIG. 8B exemplarily illustrates a second embodiment of the wireless power receiver in the wireless power system disclosed herein, wherein the wireless power receiver includes the capability to effectively compensate for varying scenarios of coupling between the coils of the wireless power transmitter and the wireless power receiver.

FIG. 8A and FIG. 8B exemplarily illustrate the wireless power receiver 100*b* disclosed herein. In both these FIGS., for simplicity, only the receiver coil 108, impedance network 111 and rectifier 109 as indicated on FIG. 1 are shown. The protection circuitry, control logic, modulator/demodulator block and ADC block are not shown but are also contained in such a wireless power receiver 100*b*. In FIG. 8A, L1*a* is the receiver coil and the impedance network is the capacitor C1*a*. The rectifier comprises of a voltage doubler and a boost circuit. Diodes D1*a* and D2*a* working in conjunction with L1*a* and C1*a* constitute the voltage doubler. Via the voltage doubler, the AC induced voltage received on L1*a* is converted to a DC voltage and doubled in value. Inductor L2*a*, switch S1*a*, diode D3*a* and filtering capacitor Cfa constitute the boost circuit. The switch S1*a* is turned on and off at a high frequency by the control logic block (not shown). By varying the duty cycle which is the on-time of switch S1*a* during each time period, the control logic block boosts its input voltage (output of voltage doubler) to a higher desired output voltage. With such a capability, the wireless power receiver 100*b* can effectively compensate for varying scenarios of coupling between the coils of the wireless power transmitter 100*a* and the wireless power receiver 100*b*. For example, if the output voltage of the voltage doubler were already high enough as would be the case when the magnetic flux coupling was good, then switch S1*a* is left open to bypass the boost circuit. If the coupling were weak, then it is likely that the output voltage of the voltage doubler is below the required threshold. In such a case, the boost circuit is employed and switch S1*a* is toggled at the appropriate duty cycle to boost the voltage. In an extreme situation, when wireless power in significant excess of the power drawn by the downstream load was received, switch S1*a* is turned on to freewheel the power back to the receiver coil thus protecting the rest of the circuitry from such excess power.

In FIG. 8B, L1*b* is the receiver coil and the impedance network is the capacitor C1*b*. The rectifier comprises of a voltage doubler and a charge-pump circuit. Diodes D1*b* and D2*b* working in conjunction with L1*b*, C1*b* and filter capacitors Cf1*b* and Cf2*b* constitute the voltage doubler. Via the voltage doubler, the AC induced voltage received on L1*b* is converted to a DC voltage and doubled in value. Switches S1*b*, S2*b*, S3*b* and S4*b*, charge pump capacitor Cp and output capacitor Cout constitute the charge pump circuit. Switches S1*b*/S4*b* and S2*b*/S3*b* are turned on and off in a paired, complementary fashion at a high frequency by the control logic block (not shown). As a result, via the charge-pump circuit shown, the voltage doubler's output voltage can be further doubled. Such a capability enables the wireless power receiver 100*b* to effectively compensate for varying scenarios of coupling between the coils of the wireless power transmitter 100*a* and the wireless power receiver 100*b*. For example, if the output voltage of the voltage doubler were already high enough as would be the case when the magnetic flux coupling was good, then switches S1*b*/S3*b* are turned off while switches S2*b*/S4*b* are turned on to bypass the charge-pump circuit. If the coupling were weak, then it is likely that the output voltage of the voltage doubler is below the required threshold. In such a case, the charge-pump circuit is employed and the switches are toggled in the appropriate sequence to double the voltage. In an extreme situation, when wireless power in significant excess of the power drawn by the downstream load was received, then all the switches of the charge-pump circuit are turned off to isolate and protect the rest of the circuitry from such excess power.

Figure 6:
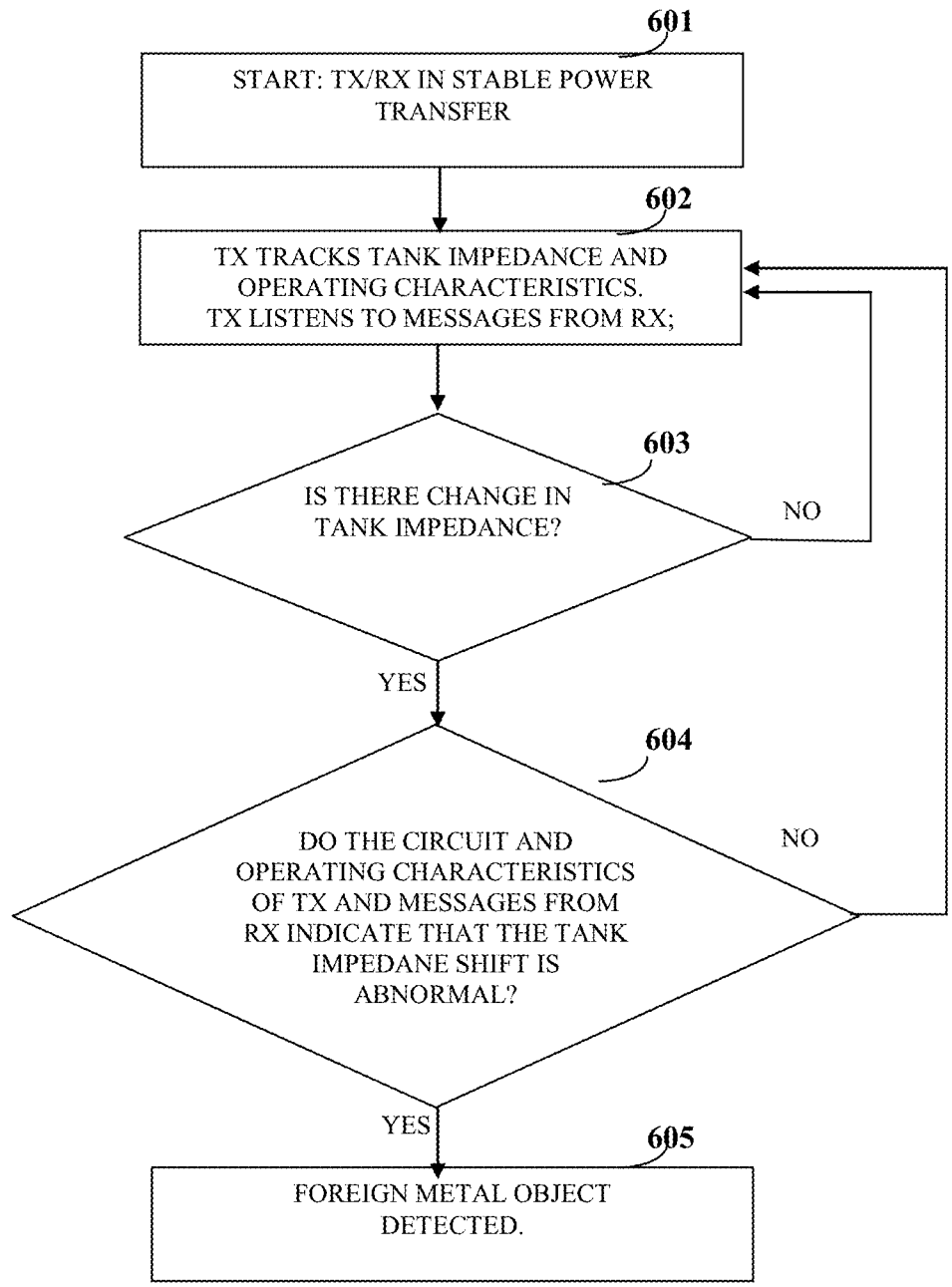
FIG. 6 exemplarily illustrates a flow chart comprising the steps for detecting unintentionally placed metal objects on the wireless power transmitter while the wireless power transmitter is delivering power to the wireless power receiver.

The method exemplarily illustrated in FIG. 5A comprises the steps for establishing a sufficient and safe wireless power transfer from the wireless power transmitter 100*a* to the wireless power receiver 100*b* when a portable device is placed on the charger in one of planar, orthogonal and intermediate modes. As an example, when a smart-watch Wearable device with wireless power receiver 100*b* that is integrated into the back of the watch whose rated power is 2 Watts (W) is placed in planar mode on the wireless power transmitter 100*a*, the wireless power transmitter 100*a* after detecting the type of wireless power receiver and level of coupling, configures its switch network as a Class D half bridge inverter, configures its Zmatch network as a pass through and operates in a frequency range of 130 to 170 KHz to ensure safe and sufficient delivery of up to 2.0 W to the downstream load of the wireless power receiver 100*b*. In a second example, if a fitness tracker Wearable device with a strap-integrated wireless power receiver 100*b* whose rated power is 1.0 W is placed in orthogonal mode on the wireless power transmitter 100*a*, the wireless power transmitter 100*a* after detecting the type of wireless power receiver and level of coupling, switches into a Class E inverter topology, operates at a fixed frequency of 150 khz, in a duty cycle range of 10 to 50% and tunes its Zmatch network for 50 ohms impedance to ensure safe and sufficient delivery of up to 1.0 W to the downstream load of the integrated wireless power receiver 100b. In a third example, the wireless power transmitter 100a may be contained in a coffee cup holder or any such container/holder for portable devices. If a mobile phone with an integrated wireless power receiver 100b whose rated power is 5.0 W is placed vertically into such a holder, the wireless power transmitter 100a in the holder and the wireless power receiver 100b in the mobile phone may be rotationally aligned in orthogonal mode or in an intermediate mode. The wireless power transmitter 100a after detecting the type of wireless power receiver and level of coupling, switches into a full-bridge Class D inverter topology, configures its Zmatch network as a pass through and operate in a frequency range of 110 khz to 150 khz and in duty cycle range of 10 to 50% to ensure safe and sufficient delivery of up to 5.0 W to the downstream load of the integrated wireless power receiver 100b. While wireless power is being delivered, if the mobile phone was moved around on the wireless power transmitter's 100a surface, the resulting induced voltage spikes would be safely quelled by the wireless power receiver 100b protection circuit that is schematically illustrated in FIG. 7. While wireless power is being delivered, if a coin such as a quarter, were placed on the wireless power transmitter 100a surface in the midst of its magnetic flux coupling region, the wireless power transmitter 100a detects an abnormal change in tank impedance and terminates the power delivery until the coin is removed as illustrated in FIG. 6.

FIG. 5B exemplarily illustrates a flow chart comprising the steps for sufficiently and safely delivering wireless power from the wireless power transmitter to the wireless power receiver where both the wireless power transmitter and the wireless power receiver are cognizant of the level of magnetic flux coupling and may configure their circuitry and operation to adjust for the level of coupling. As an example, when a smart-glass Wearable device with wireless power receiver 100b whose rated power is 0.5 Watts and that is integrated into the battery pod, is placed in orthogonal mode on the wireless power transmitter 100a, the wireless power transmitter 100a after detecting the type of wireless power receiver 100b and level of coupling, configures its switch network as a Class D half bridge inverter and operates in a frequency range of 120 to 140 KHz. The wireless power receiver 100b also senses the level of coupling and updates its rectifier topology from a non-synchronous topology to a voltage doubler topology to adjust for the level of coupling. The wireless power transmitter 100a and the wireless power receiver 100b ensure safe and sufficient delivery of up to 0.5 Watts to the downstream load of the wireless power receiver 100b.

FIG. 5C exemplarily illustrates a flow chart comprising the steps for sufficiently and safely delivering wireless power from the wireless power transmitter to multiple wireless power receivers. As an example, when a headphone Wearable device with wireless power receiver 100b whose rated power is 0.5 Watts (W) and that is integrated into the back of the headphone is placed in planar mode on the wireless power transmitter 100a at the same time as a smart watch Wearable device also placed in planar with a wireless power receiver 100b whose rated power is 1.0 Watts that is integrated into its back, the wireless power transmitter 100a after detecting their rated power of 0.5 W and 1.0 W, configures its switch network as a Class E half bridge inverter, increases the input voltage from 12V to 20V, operates at a fixed frequency of 125 khz and in a duty cycle range of 20 to 40%. The wireless power receivers 100b send messages to the wireless power transmitter 100a to receive sufficient power to satisfy their downstream loads. Based on the level of coupling, the received power may be sufficient for one of the wireless power receivers while being in excess for the other. The wireless power receiver 100b receiving excess power adjusts its impedance Network to increase its reactive impedance thereby receiving lesser power subsequently. The wireless power transmitter 100a and the wireless power receivers 100b thus ensure safe and sufficient delivery of the required power to their respective downstream loads.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A wireless power system comprising a wireless power transmitter and a wireless power receiver capable of being operatively associated with said wireless power transmitter,
    (A) said wireless power transmitter comprising:
        (a) a first circuit comprising a switch network and receiving an input voltage from an external power source,
        (b) a second circuit comprising a variable matching circuit, operatively associated with said first circuit to appropriately bias and allow said wireless power system to regulate transmitted power, said second circuit being connected between said first circuit and a transmitter coil,
        (c) said transmitter coil configured to wirelessly transmit power to said wireless power receiver, and
        (d) a third circuit comprising a control logic block, an analog to digital converter (ADC) and a modulator/demodulator block and configured to provide a pulse width modulated signal to said first circuit, wherein said third circuit is configured to perform one or more of:
        sensing the level of magnetic flux coupling between said transmitter coil of said wireless power transmitter and a receiver coil of said wireless power receiver;
        driving of said first circuit to change a topology of said switch network;
        driving of said second circuit to change said variable matching circuit's impedance characteristics;
        and constraining the frequency and duty cycle of said pulse width modulated signal to a range of values and varying said frequency and said duty cycle of said pulse width modulated signal within those respective ranges;
    (B) said wireless power receiver for receiving and conditioning the wireless power from said wireless power transmitter, said wireless power receiver comprising:
        (a) a receiver coil to receive wireless power, (b) an impedance network to control amount of wireless power received, (c) a rectifier to condition alternating current (AC) power into direct current (DC) power, (d) a protection circuit to monitor certain internal dynamic circuit characteristics of the wireless power receiver and configured to take rapid appropriate action if the circuit characteristics are not within acceptable bounds, (e) an analog to digital converter (ADC) block, (f) a modulator/demodulator block to maintain operative communication between said wireless power receiver and said wireless power transmitter, (g) a control logic to monitor internal dynamic circuit characteristics of said wireless power receiver and configured to communicate messages via said modulator/demodulator block to said wireless power transmitter;

said wireless power transmitter configured to sense said level of magnetic flux coupling under planar, orthogonal and intermediate modes of rotational misalignment and physical displacement in the X-plane, Y-plane and Z-plane, said wireless power transmitter compensating for said level of magnetic flux coupling by performing one or more of:

driving of said first circuit to change a topology of said switch network;

driving of said second circuit to change said variable matching circuit's impedance characteristics;

and constraining said frequency and said duty cycle of said pulse width modulated signal to a range of values and varying said frequency and said duty cycle of said pulse width modulated signal within those respective ranges;

whereby said change in one or more of:

said topology of said switch network, said impedance of variable matching circuit, said frequency range of said pulse width modulated signal, said duty cycle range of said pulse width modulated signal, ensures that said wireless power system can satisfy said wireless power receiver's downstream load compensating for said rotational misalignment and said physical displacement in the X-plane, Y-plane and Z-plane between said transmitter coil of said wireless power transmitter and said receiver coil of said wireless power receiver.

2. The wireless power system of claim 1 wherein in said wireless power transmitter, said switch network of said first circuit is configured as one of DC-AC inverter and AC-AC converter.

3. The wireless power system of claim 1 wherein in said wireless power transmitter, said first circuit is further comprising of a power conversion means operatively connected between said external power source and said switch network, said power conversion means configured as one of DC-DC converter to step-up or step-down or pass-through said input voltage based on signals received by said first circuit from said third circuit and AC-DC power supply to transform the AC mains power to a regulated DC voltage based on signals received by said first circuit from said third circuit.

4. The wireless power system of claim 1 wherein in said wireless power transmitter, said second circuit is further comprising of a tuning circuit operatively connected between said variable matching circuit and said transmitter coil and said tuning circuit is configured to adjust its circuitry to improve wireless power delivery based on signals received by said second circuit from said third circuit.

5. The wireless power system of claim 1 wherein said wireless power transmitter is further comprising of a plurality of transmitter coils and switches wherein one or more said transmitter coils may be activated to wirelessly transmit power to said wireless power receiver by activating the associated said switch based on signals received from said third circuit.

6. The wireless power system of claim 1 wherein said wireless power receiver is integral in a sensor containing portable device but positioned distant from the sensor containing area of said portable device.

7. The wireless power system of claim 1 wherein said wireless power receiver is integrated into a sensor containing portable device such that only said receiver coil thereof is distant from a sensor containing area of said portable device.

8. The wireless power system of claim 1 wherein said wireless power receiver is integrated into a Wearable device such that the receiver coil is integrated into one of strap and frame of said Wearable device.

9. The wireless power system of claim 1 wherein said wireless power receiver's receiver coil is inbuilt natively into one of the components of portable device.

10. The wireless power system of claim 1 wherein in said wireless power receiver, said rectifier has a voltage multiplier topology.

11. The wireless power system of claim 1 wherein in said wireless power receiver, said rectifier topology is dynamically selected from the group consisting of an asynchronous topology, half-synchronous topology, fully synchronous topology and voltage multiplier topology.

12. The wireless power system of claim 1 wherein in said wireless power receiver, said rectifier is further comprising of one of a switched-capacitor/charge-pump circuit and a boost circuit post initial AC-DC rectification.

13. The wireless power system of claim 1 wherein in said wireless power receiver, said control logic is further configured to sense level of magnetic flux coupling between said transmitter coil of said wireless power transmitter and said receiver coil of said wireless power receiver, said control logic communicates messages via the modulator/demodulator block to the wireless power transmitter based of said level of magnetic flux coupling and power drawn by said downstream load, said control logic optionally updating said impedance network and said rectifier to compensate for the level of magnetic flux coupling.

14. The wireless power system of claim 1 wherein in said wireless power receiver, said control logic updates said impedance network and said rectifier to regulate said wireless power receiver's received power to match the power drawn by said downstream load.

15. The wireless power system of claim 1 wherein in said wireless power receiver, said protection circuitry is comprising of a PMOS switch and a resistor, source terminal of said PMOS switch connected to the signal that is being protected, gate terminal of said PMOS switch driven with a voltage that is a gate threshold voltage below the maximum voltage permitted for said signal, the drain terminal of said PMOS switch connected to one end of said resistor and the other end of said resistor connected to ground potential of said wireless power receiver, wherein any voltage spikes in excess of said maximum threshold of said signal causes said PMOS switch to turn on and redirect excess power to said ground potential of said wireless power receiver via said resistor.

16. A method for establishing a sufficient and safe wireless power transfer from wireless power transmitter to wireless power receiver when said wireless power receiver contained in a portable device is placed on said wireless power transmitter in one of planar, orthogonal and intermediate modes, said method comprising:

said wireless power transmitter starting up on receiving power, said wireless power transmitter probing its surface periodically for presence of said wireless power receiver, said wireless power transmitter detecting the presence of said wireless power receiver when portable device containing said wireless power receiver is placed on said surface of said wireless power transmitter, said wireless power transmitter providing power to detected said wireless power receiver, said wireless power receiver starting up on receiving power, said wireless power receiver sending messages to said wireless power transmitter, said wireless power transmitter learning about one or more of said wireless power receiver's type, capabilities and internal circuit characteristics from said messages received from said wireless power receiver, said wireless power transmitter combining said information from said wireless power receiver with operational and circuit characteristics in said wireless power transmitter's internal circuitry to detect the level of magnetic flux coupling between said transmitter coil and said receiver coil, said wireless power transmitter detecting the level of rotational misalignment and physical displacement in the X-plane, Y-plane and Z-plane between said transmitter coil and said receiver coil when said portable device is placed on said wireless power transmitter in one of said planar, orthogonal and intermediate modes based on said detected level of magnetic flux coupling between said transmitter coil and said receiver coil, said wireless power transmitter configuring its circuitry and operating limits based on said information received from said wireless power receiver as well as said detected level of magnetic flux coupling between said transmitter coil and said receiver coil to ensure safe and sufficient power delivery to said wireless power receiver compensating for rotational misalignment and physical displacement in the X-plane, Y-plane and Z-plane between said transmitter coil and said receiver coil when said portable device is placed on said wireless power transmitter in one of said planar, orthogonal and intermediate modes, said wireless power transmitter continuing to listen to said messages from said wireless power receiver and adjusting its operating point for appropriate power transfer to said wireless power receiver, said wireless power transmitter terminating said power transfer and returning to probing its said surface periodically when said portable device containing said wireless power receiver is removed from said surface of said wireless power transmitter, said wireless power transmitter terminating said power transfer when receiving messages from said wireless power receiver to stop the power transfer, and subsequently periodically checking for removal of said portable device containing said wireless power receiver from the said surface of said wireless power transmitter, and then returning to probing its said surface periodically on detection of removal of said portable device from said surface of said wireless power transmitter.

17. The method of claim 16 wherein said wireless power receiver detecting the level of magnetic flux coupling between said transmitter coil and said receiver coil based on internal operational and circuit characteristics, said wireless power receiver configuring its circuitry to compensate for said detected level of magnetic flux coupling, said wireless power receiver sending messages to said wireless power transmitter to increase, decrease, maintain or stop the wirelessly transmitted power to match with the power drawn by the downstream load.

18. The method of claim 16 wherein said wireless power receiver dynamically adjusting its internal circuitry to match and regulate said received wireless power, said wireless power receiver sending messages to said wireless power transmitter to increase, decrease, maintain or stop the wirelessly transmitted power to match with the power drawn by the downstream load.

* * * * *